(12) United States Patent
Shteiman

(10) Patent No.: US 6,687,288 B1
(45) Date of Patent: Feb. 3, 2004

(54) NEXT CANCELLATION FOR MODEM POOLS

(75) Inventor: Arkady Molev Shteiman, Bnei-Brak (IL)

(73) Assignee: Actelis Networks Inc., Fremont, CA (US)

( * ) Notice: Subject to any disclaimer, the term of this patent is extended or adjusted under 35 U.S.C. 154(b) by 548 days.

(21) Appl. No.: 09/643,821

(22) Filed: Aug. 22, 2000

(51) Int. Cl.$^7$ .................................................. H04B 1/38
(52) U.S. Cl. ........................ 375/222; 375/346; 370/290; 379/417
(58) Field of Search ................................ 375/222, 377, 375/346; 379/417, 93.28; 370/201, 286, 290

(56) References Cited

U.S. PATENT DOCUMENTS

| | | | |
|---|---|---|---|
| 5,887,032 A | 3/1999 | Cioffi | |
| 5,970,088 A | 10/1999 | Chen | |
| 6,160,790 A | 12/2000 | Bremer | |
| 6,522,152 B1 * | 2/2003 | Tonti et al. | 324/628 |

OTHER PUBLICATIONS

J. G. Proakis & D.G. Manolakis, "Digital Signal Processing Principles, Algorithms, and Applications", 2$^{nd}$ Edition, Macmillan Publishing Company, 1992, pp. 703–709.

* cited by examiner

Primary Examiner—Temesghen Ghebretinsae
(74) Attorney, Agent, or Firm—Eitan, Pearl, Latzer & Cohen Zedek, LLP

(57) ABSTRACT

A method of NEXT cancellation in a modem pool having a plurality of modems, where each modem has at least one FIR filter, each FIR filter for filtering signals from a transmitting one of the modems, each modem transmitting a signal having a plurality of contiguous signal blocks, the method including providing a frequency response vector per FIR filter, for each corresponding one of the transmitted signal blocks for each of the modems adapting the length of the signal block to equal the length of the frequency response vector, transforming the adapted signal block into the frequency domain, thereby generating a frequency-domain signal vector, for each of the modems and its at least one FIR filter multiplying the frequency response vector of the FIR filter by a corresponding one of the frequency-domain signal vectors, thereby generating a filtered frequency-domain signal vector, adding the filtered frequency-domain signal vectors, thereby generating a combined filtered frequency-domain signal vector, transforming the combined filtered frequency-domain signal vector into the time domain, thereby generating a combined filtered time-domain signal vector, adapting the length of the combined filtered time-domain signal vector, and subtracting the adapted combined filtered time-domain signal vector from a received signal block generally corresponding in time to the transmitted signal block, thereby resulting in a received signal block from which NEXT has been at least partially cancelled.

20 Claims, 3 Drawing Sheets

NEXT CANCELLATION FOR MODEM POOLS

FIELD OF THE INVENTION

The present invention relates to modem telecommunications in general, and more particularly to NEXT cancellation for modem pools.

BACKGROUND OF THE INVENTION

Near-end cross talk (NEXT) is defined as the cross talk interference between the receiving path and the transmitting path of different transceivers that make use of wiring that share the same cable. The NEXT effect in a cable depends on the number of interfering lines, and increases as the bandwidth that the signals occupy increases. In a modem pool environment where streams of data are distributed to many lines within a single cable, the NEXT that the receivers need to overcome is mainly generated by the transmissions that the modem pool itself generates. Since such a system has access to the transmitted information for a plurality of modems, such information may be used to cancel the interference that leaks into the receivers, thus increasing the noise floor of each receiver.

In classic NEXT cancellation, a transmitter transmitting via one wire or wire grouping (e.g., twisted pair) affects the receiver receiving via another wire or wire grouping. A hybrid circuit separates the received signal from the transmitted interfering signal, but since the hybrid cannot completely separate the transmit path from the receive path, some of the transmitted signal leaks into the receiver and becomes an interfering signal. A canceller then filters out the effect of the interfering signal, resulting in a "cleaned" received signal. For a single modem, this problem may be addressed using classic echo cancellation techniques. In a modem pool environment where several modems transmits via a shared cable, the canceller for each receiver must take into account all the interfering transmitters. Thus, in order to cancel the NFM resulting from several modems in addition to each modem's echo, one approach might to apply echo canceling techniques to each transmitting modem/receiving modem pair. However, such a solution would be relatively complex to implement, since the number of filters required would equal the square of the number of modems in the pool. A system implementing such a solution is described in U.S. Pat. No. 5,970,088.

There are two types of echo cancellation solutions: static and adaptive. In static echo cancellation, the echo canceling filter is adjusted during a learning phase, and the adjusted filter is then applied at steady state. In adaptive echo cancellation, the effect of each interferer is be studied over time using an adaptive filter which continually adjusts the signal to be cancelled out in accordance with changing line conditions in order to achieve optimal cancellation. One well-known adaptation method is the least mean squares (LMS) adaptive filter in which the "cleaned" signal is multiplied by a function of the interfering signal and is integrated over time, resulting in only the "non-cleaned" part of the interfering signal remaining. This remaining signal represents the remaining energy of interference from a single transmitter. Both static and adaptive filters are estimates of the transfer function that a transmitter passed on the way to becoming an interferer.

Many static and adaptive echo canceling algorithms employ Finite Impulse Response (FIR) filters as the echo canceling filter. For a single NEXT canceller employing a FIR filter with N taps in the time domain, computing each output sample of a transmitted signal through the FIR filter requires approximately N multiplications and N additions. In a modem pool environment of M modems where any given receiver may be affected by a number of interfering transmitters, as well as by its own echo, up to M finite impulse response (FIR) filters may be required for each modem in order to cancel the NEXT from all interferers. The maximum number of arithmetic operations required for computing all output samples at a given time would therefore be of the order of $N \cdot M \cdot M = N \cdot M^2$.

It is well known that time-domain filtering may be alternatively implemented in the frequency domain for a single modem. In this technique, the coefficients of a FIR filter are transformed to the frequency domain using techniques such as Fast Fourier Transform (FFT), thereby generating frequency domain coefficients. A stream of incoming time samples is divided into blocks. Each block of time samples is then modified, such as by zero padding the block or by concatenating some samples from a previous block to the current block. These modified blocks of samples are transformed to the frequency domain using techniques such as Fast Fourier Transform (FFT), thereby generating blocks of frequency samples. Each block of frequency samples is then multiplied coordinate-wise with the frequency domain coefficients, and the results are transformed back into the time domain using techniques such as inverse FFT to generate a second sequence of blocks of time domain samples. These time domain samples are then processed, such as by considering only certain samples from each block, or by overlapping and adding adjacent blocks, to ultimately arrive at a sequence of samples which represents the same sequence that would have been encountered were the original stream of incoming samples convolved with the FIR filter coefficients. A detailed description of this technique can be found in J. G. Proakis & D. G. Manolakis, "Digital Signal Processing Principles, Algoritbms, and Applications, 2nd Edition," Macmillan Publishing Co., 1992, pp. 703–709, where two well known variants of block overlapping, "overlap add" and "overlap save," are presented.

Computing N output samples for a single FIR of N taps would then require the following computations: 2 FFTs of length N (or 2N, if zero padding is applied) for transferring to the frequency domain and back to the time domain, and N complex multiplications for effecting the filter in the frequency domain. The complexity of each FFT operation, as expressed in terms of the number of multiplication and addition operations, is on the order of $N\log(N)$, and the complexity of effecting the filter in the frequency domain is N. Thus, the total complexity for computing N output samples is on the order of $N\log(N)+N$, resulting in a total complexity per output sample of $\log(N)+1$.

The use of frequency domain techniques for NEXT canceling is described in U.S. Pat. No. 5,887,032. However, the system described in U.S. Pat. No. 5,887,032 is a DMT system in which frequency domain techniques are applied on a modem by modem basis. No mention is made of a specific application in a modem pool environment, and the techniques described would be applied in exactly the same manner for one modem as they would be for M modems. Moreover, the NEXT cancellation method described by U.S. Pat. No. 5,887,032 is disadvantageous in several respects which are now described.

In the DMT NEXT cancellation system a cyclic prefix is added to each signal block prior to its transmission. For example, if a signal block has a length of 512 bytes, and the cyclic prefix has a length of 32 bytes, the transmitted signals will comprise blocks having a length of 544 bytes, only 512 bytes of which contain information symbols, with the remaining bytes considered a redundancy to be removed at the receiver. Typically, the processing of the received signal for DMT systems is done by:

1. Converting the received signal from analog to digital (A/D converter).
2. Applying an optimized filter known as a Time Domain Equalizer (TEQ) to find an optimal frame (e.g., of 512 bytes out of the 544 bytes in the preceding example) in which the effects of Inter Symbol Interference (ISI) and Inter Channel Interference (ICI) are minimized.
3. After finding the optimal frame, removing the cyclic prefix, leaving only the signal samples in the frame.
4. Transforming the signal samples to the frequency domain.
5. Applying the NEXT cancellation algorithm, including multiplying the data transmission coefficients (which are given in the frequency domain in DMT systems) by the complex coefficients of an adaptive Filter.
6. Combining the NEXT effects from several filters.
7. Subtracting the combined NEXT effect from the received signal to produce a clean signal.

This system bas the following disadvantages:

1. It attempts to reduce the NEXT effects only for portions of the received signal frames (e.g., 512 bytes of every 544 bytes). Thus, such a system cannot be applied to time-based systems employing CAP/QAM or PAM modulation, as they require NEXT cancellation for the whole stream of received samples, and not only for selected portions.
2. It does not take into account that in DMT systems the TEQ filter if optimized for the received far-end signal and not for the NEXT signal. Moreover, a frame which is chosen with respect to a far-end signal may not be optimized for the NEXT signals, and the estimation of the NEXT may therefore suffer from the well known ISI and ICI which are characteristic for non optimized frame selection.

SUMMARY OF THE INVENTION

The present invention seeks to provide NEXT cancellation for modem pools by employing frequency domain techniques that may significantly reduce the number of computations over time-domain techniques. The use of such frequency-domain techniques is not known in a modem pool environment such as in the modem pool of M modems described above. One possible reason for this is that the cutoff point between time domain and frequency domain techniques (i.e., the point where using frequency domain techniques becomes beneficial) is commonly believed to be at approximately N=30 taps. For FIR filters with less than 30 taps, time domain techniques are much simpler and require less arithmetic operations. Only where relatively long filters are used is there a noticeable gain when applying frequency domain techniques. However, in the modem pool environment of M modems described above, transforming the transmitted signals from the time domain to the frequency domain is done only once per modem, and transforming back from the frequency domain to the time domain is done once for each receiver. While effecting the filter in the frequency domain is done for each transmitting modem/ receiving modem pair, thus requiring $M^2$ filters, this operation requires only N complex multiplications per filter. In mathematical terms, the number of FFT operations to be performed grows linearly in relation to M, while the number of multiplications grows in relation to the square of M. Thus, the maximum number of arithmetic operations per time unit required in order to cancel the NEXT from all interferers for each of the M modems would be on the order of $(M\log(N)+ M^2)$.

For example, in a modem pool comprising 30 HDSL modems with a sampling rate of 1 MHz, in order to cancel all 30 NEXT interferers for each modem with a 16 tap FIR as an estimation of each NEXT impulse response, conventional techniques would require approximately 16*900 arithmetic operations for every output sample every 1 $\mu$sec, or 14,000 MIPS ($14*10^9$ arithmetic operations each second). In contrast, the present invention reduces the number of arithmetic operations to approximately 1,000 operations every 1 $\mu$sec, or about 1,000 MIPS. Even taking into account that the 1,000 operations required are complex number operations, there still remains a significant difference from prior art approaches. If the number of taps for the FIR filters is doubled to 32, then the complexity of conventional techniques would grow to 28,000 MIPS, while the present invention will require only a slight increase in complexity of about 30 MIPS. As mentioned above, the cutoff point for a single FIR is at about 30 taps. In the above example it may be seen that for a modem pool of 30 modems there is a significant advantage to implementing the FIRs with the aid of the frequency domain techniques of the present invention even for FIRs of 16 taps. The advantage is even more significant for 30 taps, which is the cutoff point for a single FIR.

In one aspect of the present invention NEXT cancellation is provided in a modem pool having a plurality of modems, where each modem has at least one FIR filter, each FIR filter for filtering signals from a transmitting one of the modems, each modem transmitting a signal having a plurality of contiguous signal blocks. A method is provided including providing a frequency response vector per FIR filter, for each corresponding one of the transmitted signal blocks for each of the modems adapting the length of the signal block to equal the length of the frequency response vector, transforming the adapted signal block into the frequency domain, thereby generating a frequency-domain signal vector, for each of the modems and its at least one FIR filter multiplying the frequency response vector of the FIR filter by a corresponding one of the frequency-domain signal vectors, thereby generating a filtered frequency-domain signal vector, adding the filtered frequency-domain signal vectors, thereby generating a combined filtered frequency-domain signal vector, transforming the combined filtered frequency-domain signal vector into the time domain, thereby generating a combined filtered time-domain signal vector, adapting the length of the combined filtered time-domain signal vector, and subtracting the adapted combined filtered time-domain signal vector from a received signal block generally corresponding in time to the transmitted signal block, thereby resulting in a received signal block from which NEXT has been at least partially cancelled.

In another aspect of the present invention the providing step may include tansforming the coefficients of the FIR filters into the frequency domain, thereby generating the frequency response vector per FIR filter.

In another aspect of the present invention the method may further include selecting a subset of the FIR filters associated with each of the modems and performing any of the steps on the subset of FIR filters.

In another aspect of the present invention any of the adapting steps may further include performing overlap add.

In another aspect of the present invention any of the adapting steps may further include performing overlap save.

In another aspect of the present invention the method may further include feeding back the signal block from which NEXT has been at least partially cancelled to at least one of the FIR filters for adaptation thereat.

In another aspect of the present invention the method may further include initializing the taps of any of the FIR filters.

In another aspect of the present invention any of the transforming steps may further include tansforming using FFT.

In another aspect of the present invention the method may further include feeding back the received signal block from which NEXT has been at least partially cancelled to at least one of the FIR filters and adjusting the FIR coefficients in accordance with the fed-back signal.

In another aspect of the present invention the adjusting step may further include adjusting using Least Mean Square (LMS) adaptation.

In another aspect of the present invention a NEXT cancellation system is provided in a modem pool including a plurality of modems, each modem transmitting a signal having a plurality of contiguous signal blocks at least one FIR filter operably connected to each of the modems, each FIR filter for filtering signals from a transmitting one of the modems, and each FIR filter having an associated frequency response vector, means for adapting the length of any of the signal blocks to equal the length of any of the frequency response vectors, means for transforming the adapted signal block into the frequency domain, thereby generating a frequency-domain signal vector, means for multiplying the frequency response vector of the FIR filter by a corresponding one of the frequency-domain signal vectors, thereby generating a altered frequency-domain signal vector, means for adding the filtered frequency-domain signal vectors, thereby generating a combined filtered frequency-domain signal vector, means for transforming the combined filtered frequency-domain signal vector into the time domain, thereby generating a combined filtered time-domain signal vector, means for adapting the length of the combined filtered time-domain signal vector, and means for subtracting the adapted combined filtered time-domain signal vector from a received signal block generally corresponding in time to the transmitted signal block, thereby resulting in a received signal block from which NEXT has been at least partially cancelled.

In another aspect of the present invention the system may further include means for transforming the coefficients of the FIR filters into the frequency domain, thereby generating the frequency response vector per FIR filter.

In another aspect of the present invention the system may further include means for selecting a subset of the FIR filters associated with each of the modems and where any of the means is operative to process the subset of FIR filters.

In another aspect of the present invention any of the adapting means may be operative to perform overlap add.

In another aspect of the present invention any of the adapting means may be operative to perform overlap save.

In another aspect of the present invention the system may further include means for feeding back the signal block from which NEXT has been at least partially cancelled to at least one of the FIR filters for adaptation thereat.

In another aspect of the present invention the system may further include means for initializing the taps of any of the FIR filters.

In another aspect of the present invention any of the transforming means may be operative to transform using FFT.

In another aspect of the present invention the system may further include means for feeding back the received signal block from which NEXT has been at least partially cancelled to at least one of the FIR filters and where the FIR filter is operative to adjust the FIR coefficients in accordance with the fed-back signal.

In another aspect of the present invention the FIR filter may be operative to adjust using Least Mean Square (LMS) adaptation.

The disclosures of all patents, patent applications, and other publications mentioned in this specification and of the patents, patent applications, and other publications cited therein are hereby incorporated by reference.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
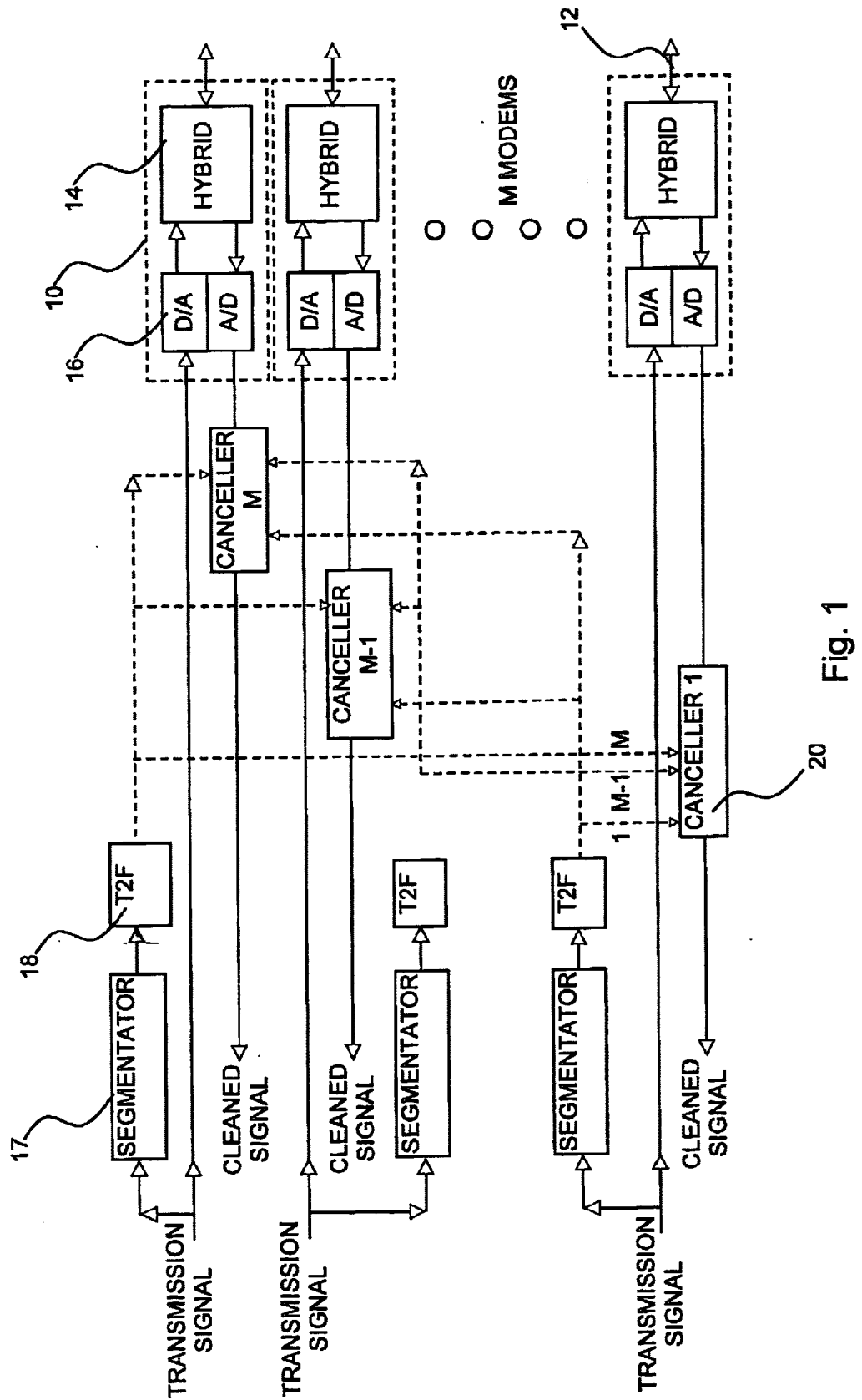
FIG. 1 is a simplified block diagram illustration of a modem pool with NEXT cancellation, constructed and operative in accordance with a preferred embodiment of the present invention.

Reference is now made to FIG. 1 which is a simplified block diagram illustration of a modem pool with NEXT cancellation, constructed and operative in accordance with a preferred embodiment of the present invention. In FIG. 1 a group of M modems 10, shown in dashed lines, are shown at one end of a communications channel 12. Selected elements of modems 10 are shown, including hybrid apparatus 14 and analog-to-digital/digital-to-analog conversion apparatus 16. In the present embodiment, transmission signals are provided to conversion apparatus 16 of modem 10, specifically for digital-to-analog conversion. A copy of the transmission signal is also provided to segmentator apparatus 17 where time-domain block signals are generated and their lengths adapted in accordance with conventional techniques. The time-domain block signals are provided to time-domain-to-frequency-domain (T2F) transformation apparatus 18 where the signal is transformed into the frequency domain and provided to up to M cancellers 20 which process the signal in accordance with techniques described hereinbelow to provide a "cleaned" signal.

Figure 2:
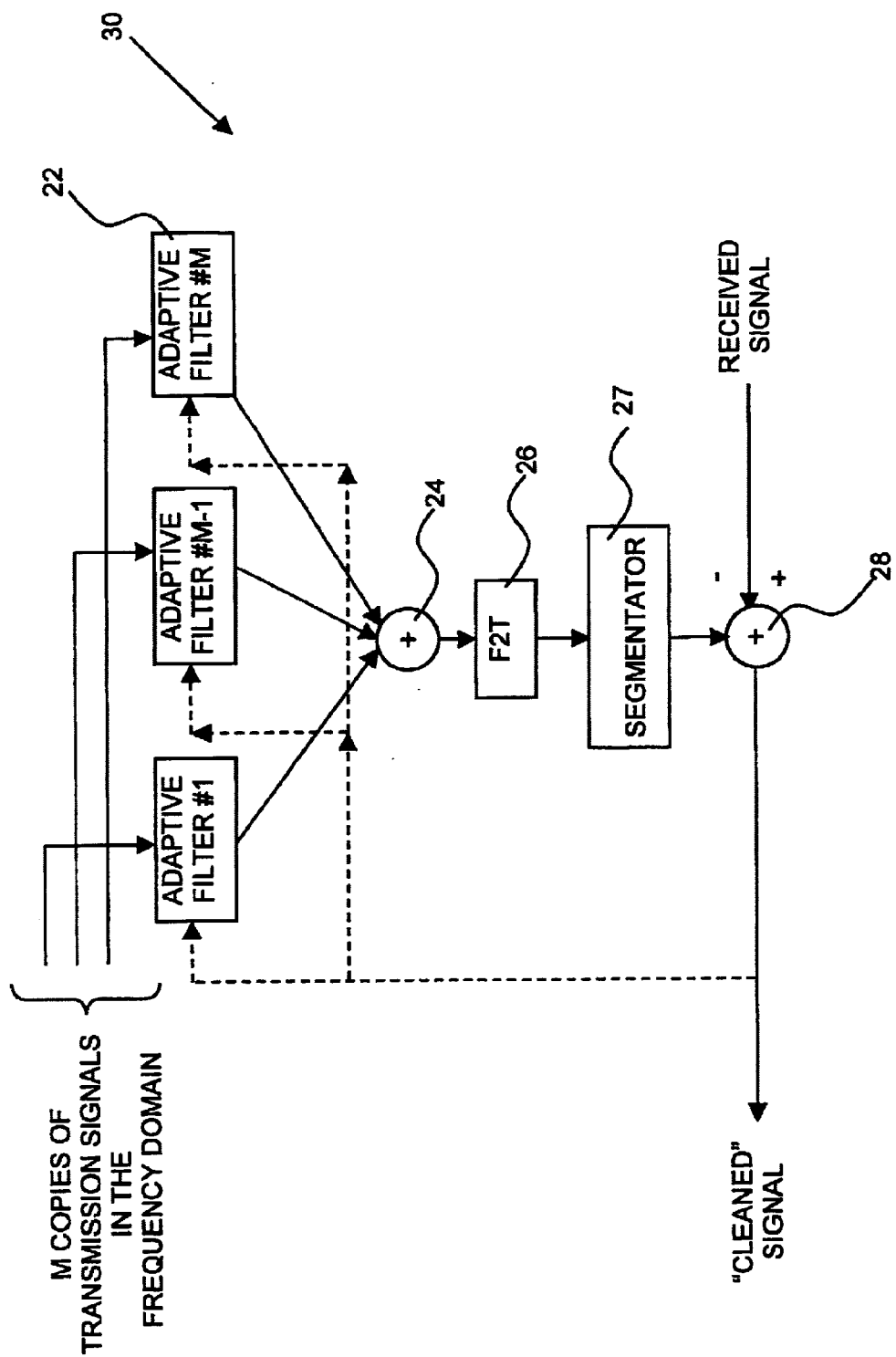
FIG. 2 is a simplified block diagram illustration of a canceller for use with the system of FIG. 1, constructed and operative in accordance with a preferred embodiment of the present invention.

Reference is now made to FIG. 2 which is a simplified block diagram illustration of a canceller for use with the system of FIG. 1, constructed and operative in accordance with a preferred embodiment of the present invention. In FIG. 2, a canceller, generally designated 30, is shown having a group of M adaptive filters 22, each of which receives a copy of a transmission signal after transformation into the frequency domain. The filtered signals are then added at an adder 24, and the combined frequency-domain filtered signal is transformed into the time domain at frequency-domain-to-time-domain (F2T) transformation apparatus 26. The combined time-domain filtered signal is then provided to a segmentator 27 which generates a time-domain signal block which is then subtracted from the received signal at an adder 28, resulting in a "cleaned" signal that may be used for further processing and may also be fed back to filters 22 for adaptation using conventional techniques.

Figure 3:
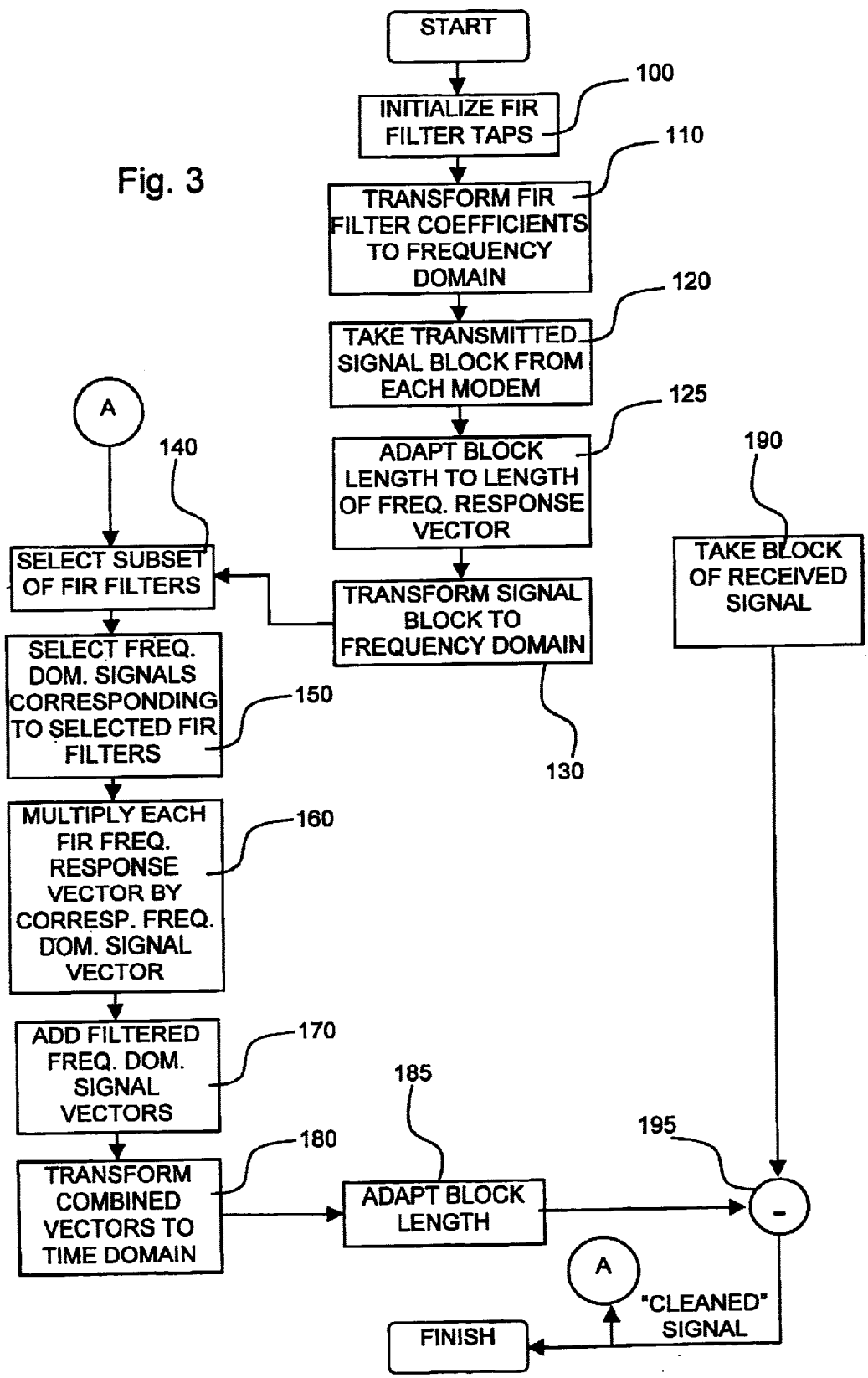
FIG. 3 is a simplified flowchart illustration of a method of NEXT cancellation for the modem pool of FIG. 1 and canceller of FIG. 2, operative in accordance with a preferred embodiment of the present invention.

Reference is now made to FIG. 3 which is a simplified flowchart illustration of a method of NEXT cancellation for the modem pool of FIG. 1 and canceller of FIG. 2, operative in accordance with a preferred embodiment of the present invention. In the method of FIG. 3, NEXT cancellation is demonstrated for a modem pool comprising M modems, with each modem having M FIR filters with N taps for each filter associated with it. Processing typically begins with initializing the FIR filters taps in accordance with conventional channel estimation techniques or by setting all the coefficients to zero (step 100). The coefficients of each FIR filter are then transformed into the frequency domain using conventional techniques, such as using FFT, thereby generating a frequency response vector associated with each filter (step 110). The length L of the frequency response vector is preferably chosen to be a power of two and is between 2N and 4N. A block, preferably of a length that is less than L–N, is then taken from the transmitted signal from each modem (step 120). The length of each block is then adapted to length L using conventional techniques such as zero padding (i.e., using "overlap add" techniques) or overlapping with previous blocks (i.e., using "overlap save" techniques) (step 125). Each signal block of length L is then transformed into the frequency domain using conventional techniques (step 130).

The following steps 140–180 are preferably applied to each individual modem. A subset of the FIRs are selected, representing the FIRs of those interferers whose signal is to be removed from the received signal of the subject modem (step 140). Up to M FIRs may be selected, including the modem's own FIR. Preferably, any conventional technique, such as channel estimation or noise power measurement, may be used to determine which modems most interfere with a given modem, and their FIRs may be selected in accordance with a user-defined threshold (e.g., the 10 most interfering modems, etc.). A subset of the frequency-domain signals transformed in step 130 above that correspond to the selected FIRs is then selected (step 150). Each frequency response vector of each selected FIR is then multiplied coordinate-wise by a corresponding frequency-domain signal vector, resulting in a filtered frequency-domain signal vector (step 160). All filtered frequency-domain signal vectors are then added (step 170), and the combined filtered frequency-domain signal vector is then transformed into the time domain using conventional techniques (step 180), resulting in a time-domain signal block of length L. The time-domain signal block is then adapted in a manner that is complementary to the specific adaptation technique performed in step 125 above to form an estimation of the NEXT in the time domain (step 185).

The following steps 190–195 are preferably applied to each individual modem and are preferably applied concurrently to steps 140–180 above. A block of the received signal at the subject modem is taken (step 190). The selected block preferably corresponds in time to the transmitted signal block selected for the subject modem. The estimation of the NEXT in the time domain transformed in step 180 above is then subtracted from the selected received signal block, resulting in a "cleaned" signal (step 195). The cleaned signal is typically used for continuing processing such as demodulation, equalization, etc. The cleaned signal also represents an error signal that may be fed back to the various FIR filters and used to adjust the FIR coefficients using conventional adaptive techniques, such as Least Mean Square (LMS) adaptation. Steps 120–195 are preferably performed continually for each new signal.

It is appreciated that the present invention may be applied to both frequency-based systems such as DMT OFDM systems, as well as to time-based systems such as CAP/QAM or PAM systems. The present invention may also be applied in mixed environments as well, such as in DSL DSLAMS, thus serving as a general NEXT cancellation scheme.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of NEXT cancellation in a modem pool having a plurality of modems, where each modem has at least one FIR filter, each FIR filter for filtering signals from a transmitting one of said modems, each modem transmitting a signal having a plurality of contiguous signal blocks, the method comprising:

providing a frequency response vector per FIR filter;

for each corresponding one of said transmitting signal blocks for each of said modems:

adapting the length of said signal block to equal the length of said frequency response vector;

transforming said adapted signal block into the frequency domain, thereby generating a frequency-domain signal vector;

for each of said modems and its at least one FIR filter;

multiplying said frequency response vector of said FIR filter by a corresponding one of said frequency-domain signal vectors, thereby generating a filtered frequency-domain signal vector;

adding said filtered frequency-domain signal vectors, thereby generating a combined filtered frequency-domain signal vector;

transforming said combined filtered frequency-domain signal vector into the time domain, thereby generating a combined filtered time-domain signal vector;

adapting the length of said combined filtered time-domain signal vector; and subtracting said adapted combined filtered time-domain signal vector from a received signal block generally corresponding in time to said transmitted signal block, thereby resulting in a received signal block from which NEXT has been at least partially cancelled.

2. A method according to claim 1 wherein said providing step comprises transforming the coefficients of said FIR filters into the frequency domain, thereby generating said frequency response vector per FIR filter.

3. A method according to claim 1 and further comprising selecting a subset of said FIR filters associated with each of said modems and performing any of said steps on said subset of FIR filters.

4. A method according to claim 1 wherein any of said adapting steps comprises performing overlap add.

5. A method according to claim 1 wherein any of said adapting steps comprises performing overlap save.

6. A method according to claim 1 and further comprising feeding back said signal block from which NEXT has been at least partially cancelled to at least one of said FIR filters for adaptation thereat.

7. A method according to claim 1 and further comprising initializing the taps of any of said FIR filters.

8. A method according to claim 1 wherein any of said transforming steps comprise transforming using FFT.

9. A method according to claim 1 and further comprising:

feeding back said received signal block from which NEXT has been at least partially cancelled to at least one of said FIR filters; and adjusting said FIR coefficients in accordance with said fed-back signal.

10. A method according to claim 9 wherein said adjusting step comprises adjusting using Least Mean Square (LMS) adaptation.

11. A NEXT cancellation system comprising:

a modem pool comprising a plurality of modems, each modem transmitting a signal having a plurality of contiguous signal blocks;

at least one FIR filter operably connected to each of said modems, each FIR filter for filtering signals from a transmitting one of said modems, and each FIR filter having an associated frequency response vector;

means for adapting the length of any of said signal blocks to equal the length of any of said frequency response vectors;

means for transforming said adapted signal block into the frequency domain, thereby generating a frequency-domain signal vector;

means for multiplying said frequency response vector of said FIR filter by a corresponding one of said frequency-domain signal vectors, thereby generating a filtered frequency-domain signal vector;

means for adding said filtered frequency-domain signal vectors, thereby generating a combined filtered frequency-domain signal vector;

means for transforming said combined filtered frequency-domain signal vector into the time domain, thereby generating a combined filtered time-domain signal vector;

means for adapting the length of said combined filtered time-domain signal vector; and means for subtracting said adapted combined filtered time-domain signal vector from a received signal block generally corresponding in time to said transmitted signal block, thereby resulting in a received signal block from which NEXT has been at least partially cancelled.

12. A system according to claim 11 and further comprising means for transforming the coefficients of said FIR filters into the frequency domain, thereby generating said frequency response vector per FIR filter.

13. A system according to claim 11 and further comprising means for selecting a subset of said FIR filters associated with each of said modems and wherein any of said means is operative to process said subset of FIR filters.

14. A system according to claim 11 wherein any of said adapting means is operative to perform overlap add.

15. A system according to claim 11 wherein any of said adapting means is operative to perform overlap save.

16. A system according to claim 11 and further comprising means for feeding back said signal block from which NEXT has been at least partially cancelled to at least one of said FIR filters for adaptation thereat.

17. A system according to claim 11 and further comprising means for initializing the taps of any of said FIR filters.

18. A system according to claim 11 wherein any of said transforming means is operative to transform using FFT.

19. A system according to claim 11 and further comprising:

means for feeding back said received signal block from which NEXT has been at least partially cancelled to at least one of said FIR filters and wherein said FIR filter is operative to adjust said FIR coefficients in accordance with said fed-back signal.

20. A system according to claim 19 wherein said FIR filter is operative to adjust using Least Mean Square (LMS) adaptation.

* * * * *